United States Patent
Taylor

(10) Patent No.: US 10,584,788 B2
(45) Date of Patent: Mar. 10, 2020

(54) GEARBOX ISOLATOR

(75) Inventor: Charles Robert Taylor, Roscoe, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 806 days.

(21) Appl. No.: 14/126,293

(22) PCT Filed: Jun. 14, 2012

(86) PCT No.: PCT/US2012/042391
§ 371 (c)(1),
(2), (4) Date: Mar. 12, 2014

(87) PCT Pub. No.: WO2012/174201
PCT Pub. Date: Dec. 20, 2012

(65) Prior Publication Data
US 2015/0040718 A1 Feb. 12, 2015

Related U.S. Application Data

(60) Provisional application No. 61/496,609, filed on Jun. 14, 2011.

(51) Int. Cl.
*F16H 57/027* (2012.01)

(52) U.S. Cl.
CPC ........ *F16H 57/027* (2013.01); *Y10T 74/2186* (2015.01); *Y10T 137/0318* (2015.04)

(58) Field of Classification Search
CPC .... F16H 57/027; F16H 57/029; F16H 57/031; F16H 57/02; F16H 2057/032;

(Continued)

(56) References Cited

U.S. PATENT DOCUMENTS 4,506,562 A * 3/1985 Yamaura ............... F16H 57/027
137/846
4,548,624 A 10/1985 Waller
(Continued)

FOREIGN PATENT DOCUMENTS

DE 199 15 471 A1 10/2000
SU 640 873 A1 1/1979

OTHER PUBLICATIONS

Des Case Corp., Catalog [online]. 2006 [retrieved Mar. 3, 2015]. retrieved from internet:<URL:http://lubeng.com.au/assets/files/Des%20Case%20Brochure.pdf>.*

(Continued)

*Primary Examiner* — Richard W Ridley
*Assistant Examiner* — Brian J McGovern
(74) *Attorney, Agent, or Firm* — Renner, Otto, Boisselle & Sklar, LLP

(57) ABSTRACT

A gearbox isolator (10) is provided to allow the gas within a gearbox cavity (50) to expand and contract in a manner that prevents the ingestion of airborne contaminants such as moisture and particulate matter. The gearbox isolator utilizes a breather bladder (22), a check valve (36) for venting gas to the atmosphere when the breather bladder is filled to capacity, and a desiccant filter (32) to provide make-up air to the gearbox when the breather bladder is empty. The desiccant filter is provided in a sealed canister (34) having a check valve (38) allowing atmospheric gas into the sealed canister when needed.

8 Claims, 3 Drawing Sheets

(58) Field of Classification Search
CPC .......... F16H 2057/02017; F16H 2057/020265; Y10Y 74/2186; Y10Y 74/2189; Y10Y 74/2188; Y10Y 74/2185; Y10T 137/0318; Y10T 137/0324; Y10T 137/0379; Y10T 137/0396
See application file for complete search history.

(56) References Cited

U.S. PATENT DOCUMENTS

| | | | | |
|---|---|---|---|---|
| 4,827,719 | A | * | 5/1989 | Paoluccio ........................ 60/478 |
| 5,062,447 | A | * | 11/1991 | Davison, Jr. .......... F16H 57/027 137/493 |
| 5,735,553 | A | * | 4/1998 | Niemiec ............ F16L 19/0212 285/101 |
| 6,663,279 | B1 | * | 12/2003 | Heinzelmann et al. ...... 374/144 |
| 2004/0025691 | A1 | | 2/2004 | Vanderhoof et al. |
| 2009/0286649 | A1 | * | 11/2009 | Sigmund ............... F16H 57/027 477/156 |

OTHER PUBLICATIONS

Des-Case, "Hydroguard™ Hybrid Breathers for low-flow applications", 2 pages.

* cited by examiner

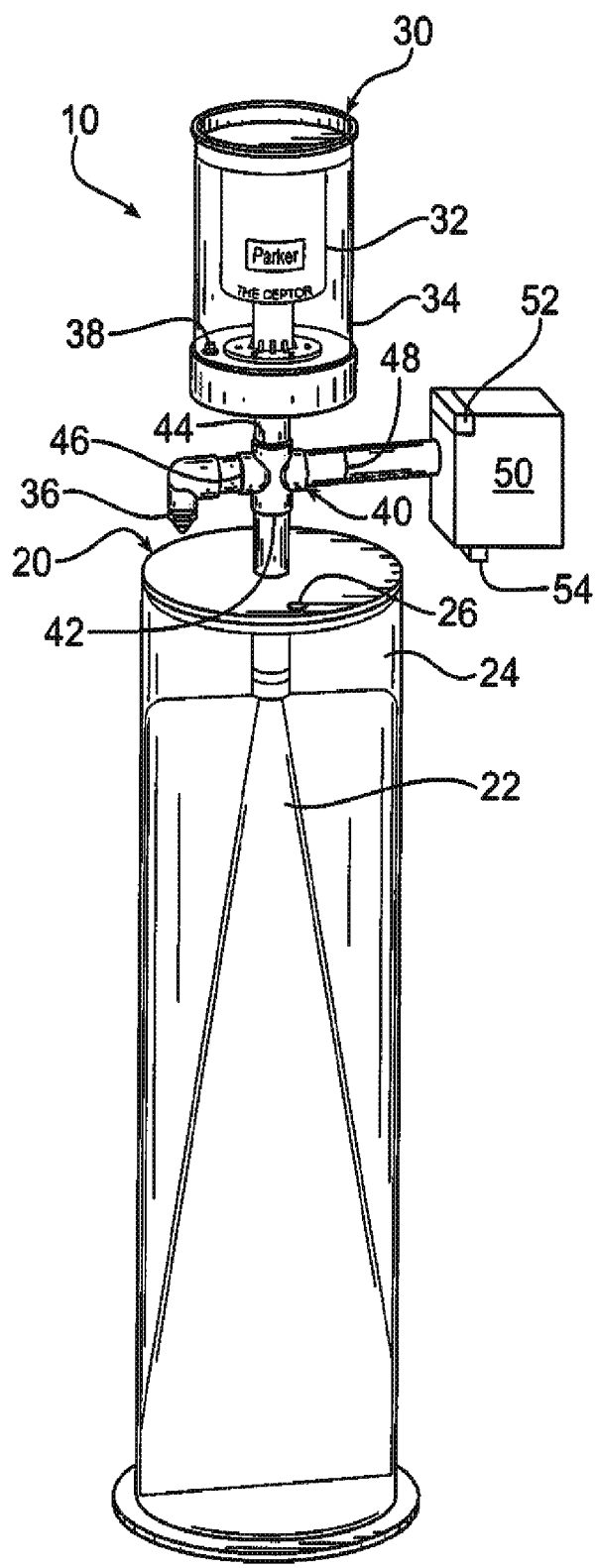
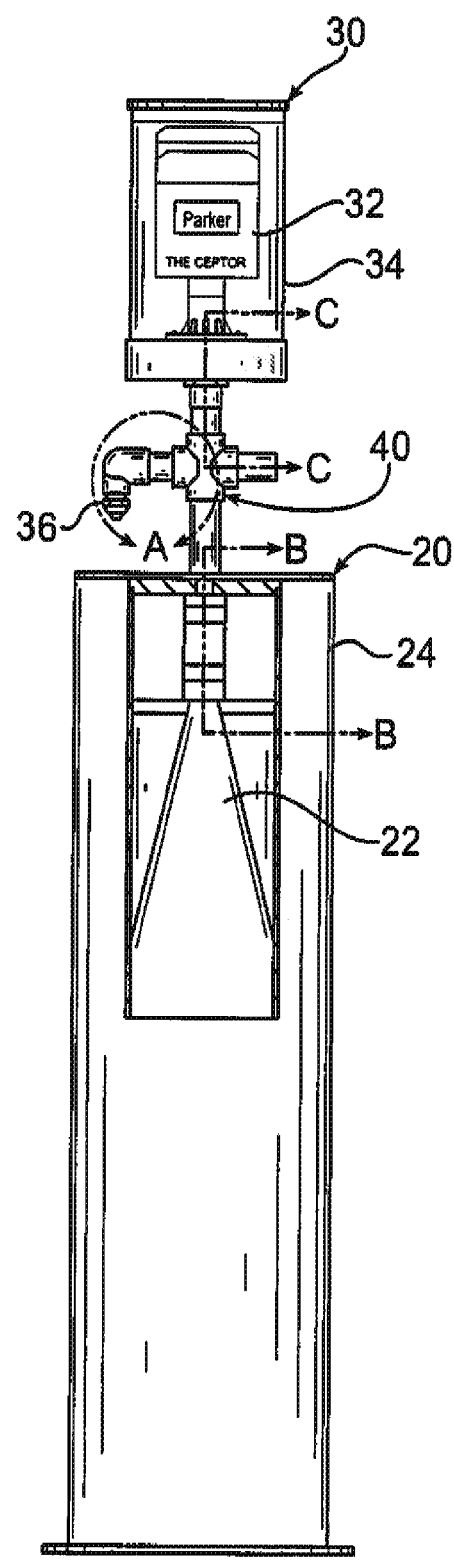
FIG. 1
FIG. 2

DETAIL A

DETAIL D-D

DETAIL B-B

SECTION C-C

US 10,584,788 B2

GEARBOX ISOLATOR

CROSS-REFERENCE TO RELATED CASES

The present application is a national stage application of International Patent Application No. PCT/US2012/042391 filed Jun. 14, 2012, which claims the benefit of U.S. Provisional Application No. 61/496,609, the disclosure of which is expressly incorporated herein by reference.

TECHNICAL FIELD

The present invention relates to air management systems for devices requiring sealed ventilation and in a particular to an air management system having particular use in isolating a gearbox from airborne contamination such as moisture and particulate matter that can pollute the gearbox cavity including the lubricant within the gearbox.

BACKGROUND

Gearboxes are mechanical devices designed to transfer rotational energy from one device to another, such as a rotating wind turbine hub to a generator. They can be found in a variety of applications and industries including wind energy, mining, manufacturing, transportation, etc. Gearboxes heat up and cool down proportionately with the intensity of operation and surrounding environment. Gearboxes heat up and cool down proportionately with the intensity of operation and surrounding environment. The gas (air) inside the cavity's head space, which is the volume in the cavity above the oil level, must be able to expand and contract due to turbulence and these temperature changes without creating any appreciable internal pressure or vacuum respectively. Internal pressure or vacuum may cause the gearbox to leak past the shaft seals in both directions. A seal leak caused by a vacuum condition is of particular concern as this will allow ingestion of contamination directly into the bearing area and entire cavity thereafter. A breather vent is commonly used to allow the gearbox to aspirate freely. As a result of the turbulence and temperature driven aspiration, the gearbox is subject to the continuous ingestion of airborne contamination through a typical breather vent.

Gearboxes are typically deployed in areas that can contain numerous airborne contaminants. Desiccant and other types of filters are typically installed in the breather vent ports as an alternative to a common filterless breather vent. Desiccant breathers are ideal, full aspiration range, short term gearbox filters, but are quickly saturated by ambient humidity rather than the gearbox aspiration itself. As a result, in typical open-air applications, desiccants require continual replacement in order to protect the gearbox. Lastly, once the desiccant media is saturated, they offer no protection against moisture condensates. This leads to a need for more frequent filter maintenance and if not maintained, in the worst case, a catastrophic failure of the gearbox can occur. These repairs are very costly when one considers lost revenue due to down time.

Other solutions include bladder breathers. Bladder breathers are ideal fixed volume, long term, aspiration devises, but typically allow pressure and vacuum gradients to build up, due to bladder stretching, in the gearbox as the pressure or vacuum approaches the check valve limits. They offer no protection in abnormal, harmful, vacuum conditions as they are designed to draw in potentially contaminated make-up air to self-correct the internal and external pressure balance. As a result, they must be designed with substantial volume to cover the full operational range and attempt to cover a portion of the abnormal range.

This improved gearbox isolator differs from other solutions in that it protects the gearbox's entire aspiration range from contamination and in particular, the harmful vacuum conditions that may exist. It accomplishes this with a near zero pressure gradient, safely and compactly, over a significantly extended duration.

SUMMARY

At least one embodiment of the invention provides a gearbox isolator device: a breather bladder fluidly connected to a gearbox and adapted to store and return gas from the gearbox; a reservoir assembly fluidly connected to the gearbox comprising a desiccant filter positioned in a reservoir gas canister, the reservoir gas canister including vacuum check valve, the reservoir assembly adapted to provide make-up air to the gearbox filtered by the desiccant filter from atmosphere; a pressure check valve fluidly connected to the gearbox and adapted to allow gas from the gearbox to vent to atmosphere when the breather bladder cannot take in additional air.

At least one embodiment of the invention provides a method of controlling the air within a cavity of a gearbox comprising the steps of: fluidly connecting a breather bladder to a gearbox; allowing gas from the gearbox to flow from the gearbox to the breather bladder and to return from the breather bladder to the gearbox; fluidly connecting a desiccant filter to the gearbox; allowing gas from atmosphere to pass through a vacuum check valve then through the desiccant filter and then to the gearbox to selectively provide make-up air to the gearbox; fluidly connecting a pressure check valve to the gearbox; allowing gas from the gearbox to vent to atmosphere when the breather bladder cannot take in additional air.

BRIEF DESCRIPTION OF THE DRAWINGS

Embodiments of this invention will now be described in further detail with reference to the accompanying drawings, in which:

FIG. 1 is a perspective view of a prototype of an embodiment of the gearbox isolator of the present invention;

FIG. 2 is a cross-sectional view of the gearbox isolator of FIG. 2;

DETAILED DESCRIPTION OF THE DRAWING

Figure 3:
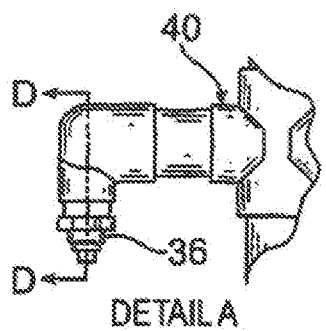
FIG. 3 is a detail view of a check valve portion of the gearbox isolator of FIG. 2.
Figure 4:
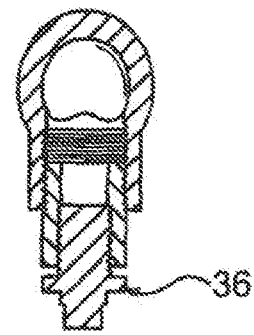
FIG. 4 is a cross-sectional view of the check valve portion of the gearbox isolator of FIG. 3.
Figure 5:
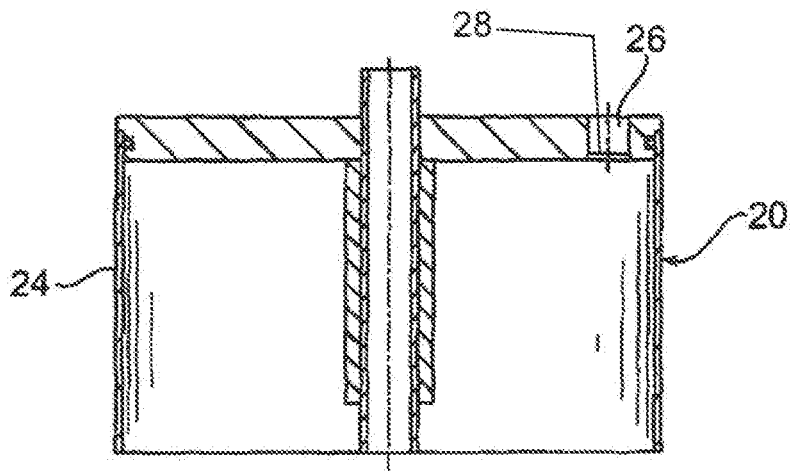
FIG. 5 is a cross-sectional view of the tube and gas container portions of the gear-box isolator of FIG. 2.
Figure 6:
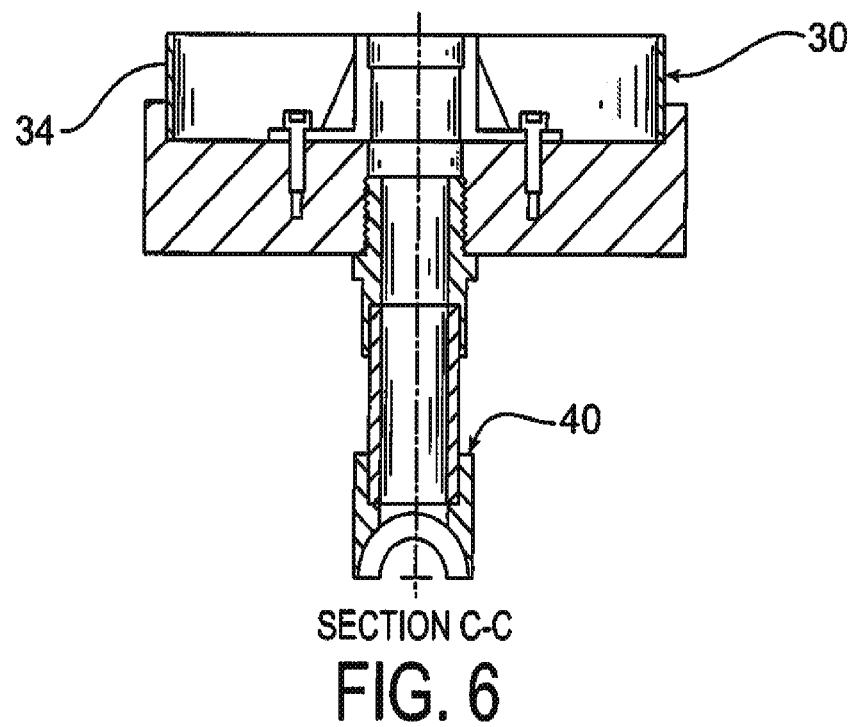
FIG. 6 is a cross-sectional view of the connector and reservoir assembly portions of the gear-box isolator of FIG. 2.
Figure 7:
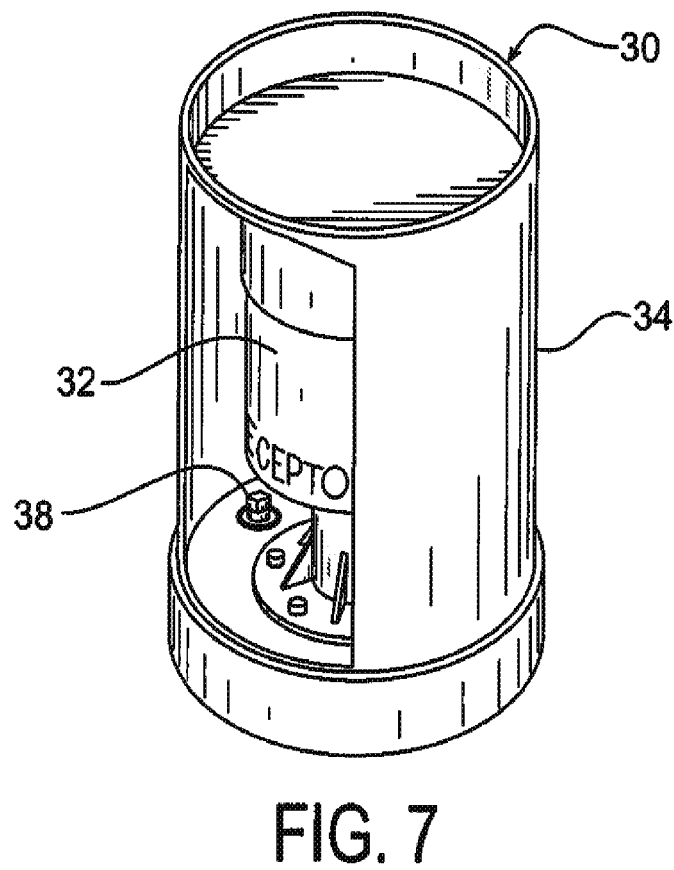
FIG. 7 is a perspective view of the reservoir assembly including a cutaway of a portion of the canister revealing the desiccant filter and the vacuum check valve.

Referring to FIGS. 1-7, an embodiment of an air management system referred to herein as a gearbox isolator 10 is shown in various views. While the term "gearbox isolator" is used and shown in an application on a gearbox, it is understood that the term "gearbox isolator" includes other applications as well. The gearbox isolator comprises 10 a breather assembly 20 comprising a breather bladder 22 positioned in a breather canister 24, a reservoir assembly 30 comprising a desiccant filter 32 positioned in a reservoir canister 34, and a gearbox check valve 36. A connector tee 40, shown as a four way connector, has a first connection passage 42 that connects the bladder 22 within the breather canister 24, a second connection passage 44 that connects the filter 32 within the reservoir canister 34, a third connection passage 46 that connects the pressure check valve 36, and a fourth connection passage 48 that is connected to a gearbox 50. The breather canister 24 includes a breather aperture 26 to allow air into and out of the canister 24 to accommodate air volume changes within the canister due to the breather bladder 22 filling and discharging. As shown in FIG. 5, which is a schematic representation that does not necessarily indicate a specific size or location, the aperture 26 may have a filter 28 positioned within the aperture 26. The filter 28 may be a screen, a sponge, or a permeable membrane. The reservoir canister 34 includes a canister check valve 38 that allows outside air into the reservoir canister 34 when the gearbox 50 needs make-up air.

The operation of the gearbox isolator 10 is described below:

When the gearbox 50 heats up, the gas from the gearbox cavity 50 expands and flows into the gearbox isolator 10 where it flows through the tee 40 and into the bladder 22 in the breather canister 24. The bladder 22 expands as the gas from the gearbox 50 enters the bladder 22 while the air within the canister 24 is expelled through aperture 26.

In some situations, the gearbox 50 may heat up such that the gas leaving the gearbox is beyond the ability of the bladder 22 to hold. In such cases, the excess gas will be expelled through the gearbox check valve 36 and into the atmosphere.

When the gearbox 50 cools down, the gas within the bladder 22 is pulled into the gearbox 50 and air from the atmosphere enters the canister 24 to accommodate the smaller bladder 22 through aperture 26 and helps deflate the bladder 22. If the gearbox 50 cools down to a point where there is no gas left in the bladder 22 and additional gas is still needed, the reservoir assembly 30 will provide make up gas. Air enters the reservoir canister 34 through the canister check valve 38 and is cleaned and dried as it passed through the desiccant filter 32 and travels through the tee passage 40 to the gearbox 50.

Accordingly, the gearbox isolator 10 provides an added degree of safety and passive intelligence through a circuit of check valves 36, 38 for both pressure and vacuum that function as a relief and a make-up respectively if the gearbox 10 is in danger of exceeding allowable pressure and vacuum operating ranges. Excess pressure is simply vented to atmosphere while the desiccant filter 32 housed in a sealed enclosure of reservoir canister 34 is used to remove any humidity that may be introduced if the canister check-valve 38 is engaged for make-up volume. The sealed enclosure 34 eliminates the affect of ambient humidity on the desiccant media, increasing service life and replacement interval.

The gearbox isolator 10 prevents the ingestion of airborne contaminants such as moisture and particulate matter within a gearbox 50 while still allowing the gearbox 50 to aspirate normally. The externally mounted bladder 22 works as a lung to provide positive sealing from the outside atmosphere (preventing contamination of any air and liquid within the gearbox.) The bladder 22 allows the same volume of clean gas to be exchanged in and out of the gearbox cavity 50 under normal operating conditions. The breather bladder 22 is made of a flexible, generally impermeable material that will easily expand to its full free state and conversely contract to a fully collapsed free state. Elastomers and Thermoplastics are suitable materials for breather bladder 22 construction. In this embodiment of the gearbox isolator 10, a thermoplastic material is used to avoid allowing the breather bladder 22, to stretch beyond its free state. It is desirable to allow the breather bladder to fully reach maximum and minimum free state volumes under very low pressures and then trigger the pressure and vacuum check valves 36, 38 decisively. The stretching process typical with elastomers allows an undesirable pressure gradient to build as the system pressure approaches the threshold of the pressure check 36. Therefore, in the use of elastomeric breather bladders 22, a breather bladder canister 24 is necessary to eliminate the possibility of stretching, beyond its full free state before actuating the check valves 36. Conversely, the thermoplastic breather bladders 22 free state stiffness resists stretching beyond the full free state and allows the actuation of the check valves 36, 38 without the need for an enclosure.

The desiccant filter 32 is integrated into the gearbox isolator 10 to eliminate humidity and is part of a system that is completely closed from the outside atmosphere when not in use. This closed system extends the usable life of the desiccant filter 32 beyond typical installations found in other solutions (leading to less required maintenance and overall operational costs). Furthermore, through the use of both an in-bound and an outbound check valve, 36. 38, the gearbox isolator 10 allows for internal pressure fluctuations that enable a smaller and more diverse footprint installation than other solutions. This flexibility in size and volume allow the gearbox isolator 10 to be installed in areas and applications that are constrained by space.

Abnormal pressure and vacuum levels can be caused by both operational and seasonal temperature differentials. To address this, an added degree of safety and passive intelligence is provided through a self-correcting circuit of check valves 36, 38 for both pressure and vacuum that function as a relief and a make-up respectively if the gearbox 50 is in danger of exceeding allowable pressure and vacuum levels operating ranges. The bladder design allows for a very narrow total vacuum-to-pressure range and corrections are handled passively. Excess pressure is simply vented to atmosphere through the pressure check valve 36. Excess vacuum is addressed through a desiccant filter 32 housed in a sealed enclosure 34 and is used to remove any humidity moisture and contamination that may be introduced if the vacuum check-valve 38 is engaged and make-up air volume is required. The sealed enclosure 34 eliminates the deteriorous effect of ambient humidity on the desiccant media, increasing both service life and replacement interval.

The gearbox isolator 10 unit will work in a variety of geographic locations, environments and climates. It is especially well suited for equipment deployed in high-humidity environments. Additionally the gearbox isolator 10 unit will be designed to operate with a variety of gearboxes as well as hydraulic power units and other types of mechanisms requiring sealed ventilation.

Additional variants are contemplated with the intent to offer condition monitoring sensors 52, 54 as shown in FIG. 1 wherein sensor 52 is positioned within the gearbox and sensor 54 is positioned outside the gearbox. This will allow the user to monitor an array of performance critical data such as, but not limited to; moisture, pressure, temperature, vibration, humidity, and particle count both inside and outside the cavity, as applicable. This will indicate that the system is performing properly and will be useful in determining maintenance regimes as well as needed service and repairs that might have gone undetected.

As shaft seal technology improves, as this product applies to gearboxes, higher pressures can be accommodated and allow a greater pressure and vacuum range, thus allowing greater threshold pressures on the check valve circuit resulting in the ability to reduce the bladder volume, system size and improve economy.

Unlike other bladder breather products that have to be sized for 100% of the expansion volume, because they offer no abnormal vacuum condition solution, the gearbox isolator 10 can be undersized in critical space applications. However, the system will call on the vacuum check 38 and desiccant 32 more frequently, reducing the potential life of the desiccant 32, but still offering complete protection for the duration.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. A gearbox isolator device adapted to be used with a gearbox, the gearbox isolator device comprising:
a breather bladder fluidly connectable to the gearbox and adapted to store and return gas from the gearbox;
a reservoir assembly fluidly connectable to the gearbox, the reservoir assembly comprising a desiccant filter positioned in a reservoir gas canister, the reservoir gas canister including a vacuum check valve, the reservoir assembly adapted to provide make-up air to the gearbox filtered by the desiccant filter from atmosphere;
a pressure check valve fluidly connectable to the gearbox and adapted to allow gas from the gearbox to vent to atmosphere when the breather bladder cannot take in additional air; and
first, second, and third fluid passageways that are fluidly connected, wherein
(a) the breather bladder is fluidly connectable to the gearbox via the first fluid passageway,
(b) the reservoir assembly is fluidly connectable to the gearbox via the second fluid passageway, and
(c) the pressure check valve is fluidly connectable to the gearbox via the third fluid passageway, in which the third fluid passageway does not include the reservoir assembly;
wherein the pressure check valve is separate and spaced from the reservoir assembly, further comprising a connector tee that includes extension tubes extending from the tee to form the first, second, and third fluid passageways between the gearbox and respectively the bladder, the reservoir assembly, and the pressure check valve.

2. The gearbox isolator device as in claim 1,
wherein the breather assembly further comprises a breather canister, the bladder enclosed within the breather gas canister;
wherein the breather gas canister includes an aperture through a wall of the breather gas canister allowing air to enter and exit the breather gas canister,
wherein the aperture has a filter positioned within the aperture.

3. The gearbox isolator device as in claim 2, wherein the filter is a screen, a sponge, or a permeable membrane.

4. The gearbox isolator device as in claim 1, wherein the connector tee is a 4 way connector.

5. The gearbox isolator device as in claim 1, further comprising the gearbox and a sensor positioned outside of the gearbox, the sensor adapted to detect at least one of the properties including pressure, temperature, and humidity.

6. A gearbox isolator device adapted to be used with a gearbox, the gearbox isolator device comprising:
a breather bladder fluidly connectable to the gearbox and adapted to store and return gas from the gearbox;
a reservoir assembly fluidly connectable to the gearbox, the reservoir assembly comprising a desiccant filter positioned in a reservoir gas canister, the reservoir gas canister including a vacuum check valve, the reservoir assembly adapted to provide make-up air to the gearbox filtered by the desiccant filter from atmosphere;
a pressure check valve fluidly connectable to the gearbox and adapted to allow gas from the gearbox to vent to atmosphere when the breather bladder cannot take in additional air; and
first, second, and third fluid passageways that are fluidly connected, wherein
(a) the breather bladder is fluidly connectable to the gearbox via the first fluid passageway,
(b) the reservoir assembly is fluidly connectable to the gearbox via the second fluid passageway, and
(c) the pressure check valve is fluidly connectable to the gearbox via the third fluid passageway, in which the third fluid passageway does not include the reservoir assembly;
wherein the pressure check valve is separate and spaced from the reservoir assembly;
wherein the breather bladder is made of a thermoplastic material.

7. A method of controlling gas within a cavity of a gearbox comprising the steps of:
fluidly connecting a breather bladder to a gearbox,
allowing gas from the gearbox to flow from the gearbox to the breather bladder and to return from the breather bladder to the gearbox;
fluidly connecting a desiccant filter to the gearbox;
allowing gas from atmosphere to pass through a vacuum check valve then through the desiccant filter and then to the gearbox to selectively provide make-up air to the gearbox;
fluidly connecting a pressure check valve that is separate and spaced from the reservoir assembly to the gearbox;
allowing gas from the gearbox to vent to atmosphere via the pressure check valve when the breather bladder cannot take in additional air;
placing the breather bladder in a breather canister having an aperture through a wall of the breather canister;
allowing atmospheric gas to flow out of the breather canister when the breather bladder expands; and
allowing atmospheric gas to flow into the breather canister when the breather bladder deflates
further comprising the steps of:
positioning a sensor outside the gearbox, and
sensing a condition outside the gearbox using the outside sensor, the sensed condition being at least one of the properties including pressure, temperature, and humidity.

8. The method as in claim 7, wherein the steps of:
fluidly connecting the breather bladder to the gearbox;
fluidly connecting the desiccant filter to the gearbox; and
fluidly connecting the pressure check valve to the gearbox;

are accomplished by fluidly connecting a four way tee to the gearbox and fluidly connecting the breather bladder, the desiccant filter, and the pressure check valve to the four way tee.

\* \* \* \* \*